Patented Dec. 9, 1941

2,265,153

UNITED STATES PATENT OFFICE 2,265,153

PROCESS OF PREPARING CHROMABLE DYE-STUFFS OF THE TRI-ARYLMETHANE SERIES

Wilhelm Eckert and Karl Schilling, Frankfort-on-the-Main, Germany, assignors to General Aniline & Film Corporation, a corporation of Delaware No Drawing. Application April 3, 1939, Serial No. 265,782. In Germany April 9, 1938

5 Claims. (Cl. 260—336)

The present invention relates to a process of preparing chromable dyestuffs of the triarylmethane series.

We have found that chromable dyestuffs of the triarylmethane series are obtainable by heating at a temperature above about 160° C. in presence or absence of a diluent an ortho-benzoyl-benzoic acid obtainable by the reaction of 3-hydroxybenzene-1.2.4-tricarboxylic acid or 5-hydroxybenzene-1.2.4-tricarboxylic acid (3- or 5-hydroxy-trimellitic acid) or the corresponding anhydrides thereof with an N-substituted meta-amino-phenol at a temperature of about 120° C. to about 130° C.

It is surprising that in this process, probably by the cleavage of a part of the benzoyl-benzoic acid used as starting material, a dyestuff is formed.

The following examples serve to illustrate the invention, but they are not intended to limit it thereto:

(1) (4'-diethylamino-2'-hydroxy) - 2 - benzoyl-hydroxy-carboxy-1-benzoic acid obtainable by melting in the course of several hours, for instance three hours, at about 120° C. to 130° C. meta-diethylamino-phenol with 5-hydroxybenzene-1.2.4-tricarboxylic acid; cf. Example 5 of our U. S. application Serial No. 127,312 filed February 23, 1937, now Patent No. 2,153,059, issued April 4, 1939, or its hydrochloride or a mixture of both compounds is heated for 3 to 4 hours, while stirring, at 190° C. to 200° C. (temperature of the mixture) in an oil heated vessel. The mass first assumes a red color and then soon melts together. Water escapes and also hydrochloric acid, if the hydrochloride has been used, and finally carbonic acid. When the melt becomes very viscous or nearly solid the formation of the dyestuff is complete.

The melt is allowed to cool, pulverized and dissolved in a dilute alkali solution; the solution is acidified by means of a dilute mineral acid until a test portion poured on filter paper remains colorless. A red dyestuff is precipitated which, as regards its dyeing properties, is identical with the dyestuff described in Example 1 of our above named U. S. application Serial No. 127,312. The thermal decomposition of the benzoyl-benzoic acid mentioned above may also be performed in a solvent of high boiling point such as trichlorobenzene. The dyestuff formed separates and may be filtered with suction.

(2) By working as described in Example 1 and using instead of the (4'-diethylamino-2'-hydroxy) - 2 - benzoyl-hydroxy-carboxy - 1 - benzoic acid the corresponding dimethyl compound obtainable in a manner analogous to that applied for the diethyl compound, a dyestuff is obtained which, as regards its dyeing properties, is identical with that described in Example 2 of our above named U. S. application Serial No. 127,312.

We claim:

1. The process which comprises heating at a temperature of above about 160° C. an ortho-benzoyl-benzoic acid which is obtained by melting at about 120° C. to about 130° C. in the course of several hours a N-substituted meta-amino-phenol containing a reactive hydrogen atom in para-position to the substituted amino group with 5-hydroxybenzene-1.2.4-tricarboxylic anhydride.

2. The process which comprises heating at a temperature of above about 160° C. (4'-dialkylamino-2'-hydroxy)-2-benzoyl-hydroxy-carboxy-1-benzoic acid which is obtained by melting at about 120° C. to about 130° C. in the course of several hours meta-dialkylamino-phenol containing a reactive hydrogen atom in para-position to the substituted amino group with 5-hydroxybenze-1.2.4-tricarboxylic anhydride.

3. The process which comprises heating at a temperature of about 190° C. to about 200° C. (4'-dialkylamino - 2' - hydroxy) - 2 - benzoyl - hydroxy-carboxy-1-benzoic acid which is obtained by melting at about 120° C. to about 130° C. in the course of several hours meta-dialkylamino-phenol containing a reactive hydrogen atom in para-position to the substituted amino group with 5-hydroxybenzene-1.2.4-tricarboxylic anhydride.

4. The process which comprises heating at a temperature of about 190° C. to about 200° C. (4'-dialkylamino - 2' - hydroxy) - 2 - benzoyl - hydroxy-carboxy-1-benzoic acid which is obtained by melting at about 120° C. to about 130° C. in the course of several hours meta-dialkylamino-phenol with 5-hydroxybenzene-1.2.4-tricarboxylic anhydride.

5. The process which comprises heating at a temperature of about 190° C. to about 200° C. (4'-dialkylamino - 2' - hydroxy) - 2 - benzoyl - hydroxy-carboxy-1-benzoic acid which is obtained by melting at about 120° C. to about 130° C. in the course of several hours meta-dialkylamino-phenol with 5-hydroxybenzene-1.2.4-tricarboxylic anhydride.

WILHELM ECKERT.
KARL SCHILLING.